Nov. 16, 1937.　　　A. N. WENDEL　　　2,099,637
TRACTOR ATTACHMENT
Filed March 9, 1937　　　2 Sheets-Sheet 1
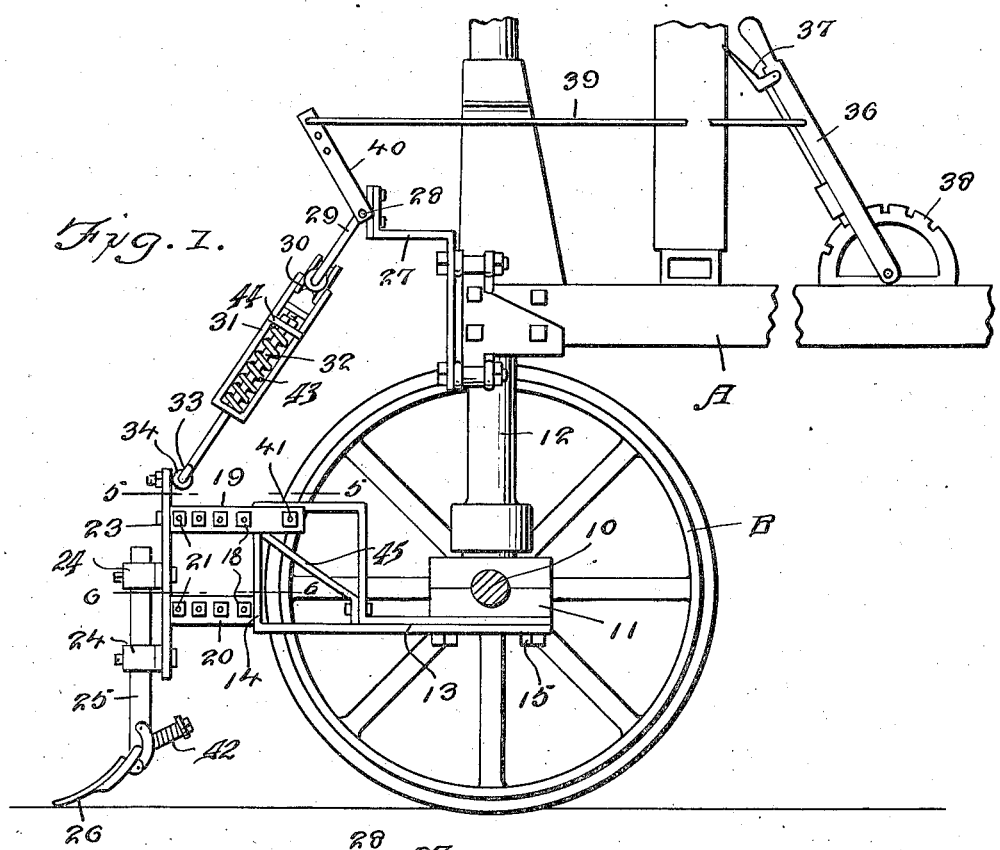
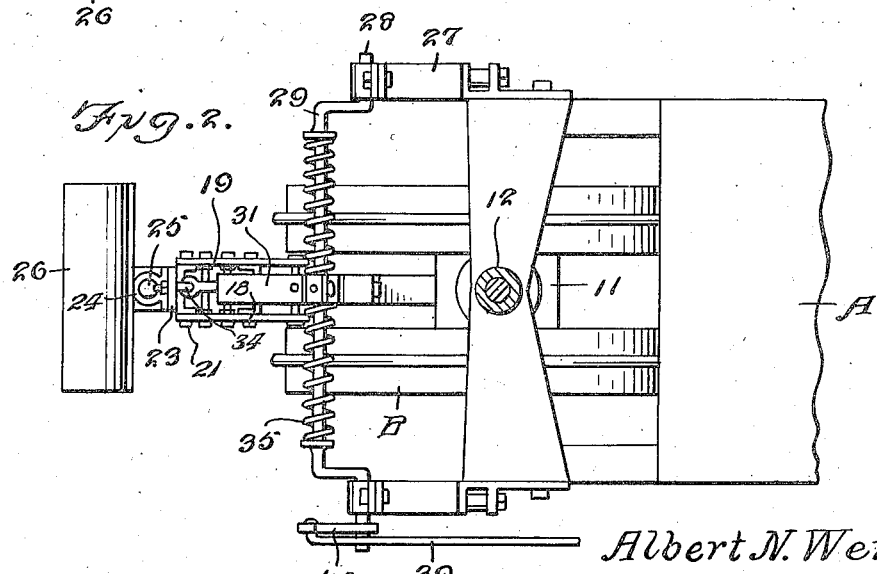
Albert N. Wendel
INVENTOR
BY Victor J. Evans & Co.
ATTORNEYS

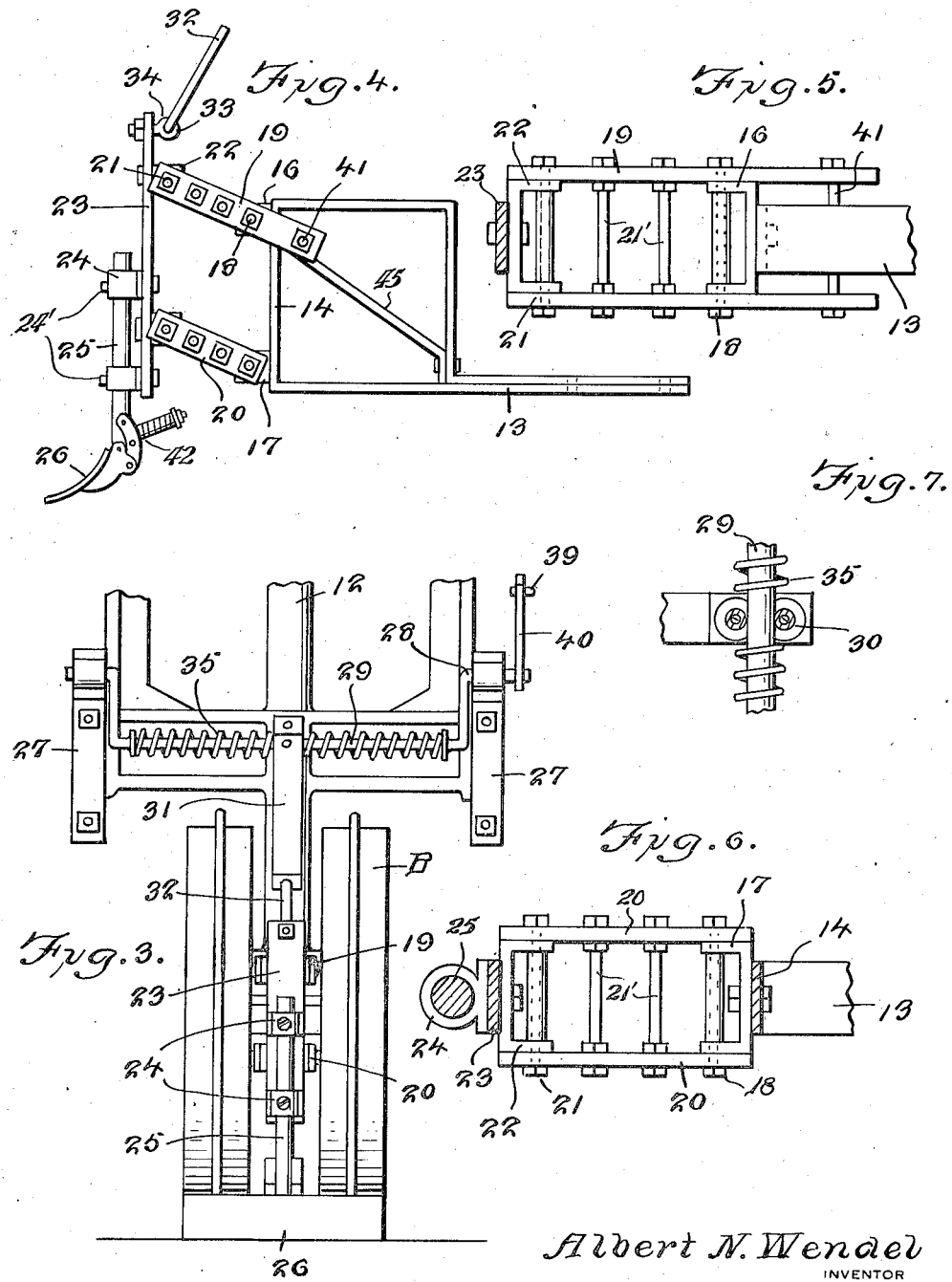

Patented Nov. 16, 1937

2,099,637

UNITED STATES PATENT OFFICE 2,099,637

TRACTOR ATTACHMENT

Albert N. Wendel, Meservey, Iowa

Application March 9, 1937, Serial No. 129,886

4 Claims. (Cl. 97—47)

The invention relates to a tractor attachment and more especially to a ridge cutter attachment for tractors.

The primary object of the invention is the provision of an attachment of this character, wherein the same is arranged for support at the forward end of a tractor and is susceptible of adjustment for the cutting of ridges in the path of such tractor when the latter is utilized as a draft medium for cultivating machines or implements and in this way eliminates to a marked degree the rough riding of the tractor particularly when traveling over a plowed field when the cultivating machines are under draft thereby.

Another object of the invention is the provision of an attachment of this character, wherein adjustment thereof can be had to regulate the depth of cut in ridges in a ground surface when upon a tractor, the attachment being of novel construction and is unaffected when steering the tractor in a course under advancement thereof.

A further object of the invention is the provision of an attachment of this character, which is simple in its construction, thoroughly reliable and efficient in operation, readily and easily adjusted, convenient for mounting upon a tractor, strong, durable, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a fragmentary elevation partly in section of a tractor showing the attachment constructed in accordance with the invention applied.

Figure 2 is a fragmentary top plan view.

Figure 3 is a front elevation.

Figure 4 is an enlarged fragmentary side elevation of the attachment removed from the tractor.

Figure 5 is a horizontal sectional view through the attachment taken on the line 5—5 of Figure 1.

Figure 6 is another horizontal sectional view taken on the line 6—6 of Figure 1.

Figure 7 is a fragmentary detail sectional view through the attachment.

Similar reference characters indicate corresponding parts throughout the several views in the drawings.

Referring to the drawings in detail, A designates generally a portion of a wheeled tractor and B the front steering wheels, these supported by an axle 10 fitting an axle boxing 11, the steering column being indicated at 12. The attachment comprises a strap-like bracket 13 bent on itself to provide an upstanding frame end 14, the bracket being bolted to the boxing at 15 aligned with the center longitudinal axis or median of the tractor A. The frame end 14 is disposed vertically forwardly of the axle 10 and is provided at the foremost portion thereof with upper and lower bearing ears 16 and 17, respectively, in which are fitted horizontal pivots 18 engaged in the respective upper and lower side links 19 and 20 which by pivots 21 are swingingly connected with pivot ears 22 formed on a perpendicularly arranged carrier head 23 which at its forward face has attached thereto clamps 24 fitting the stem or standard 25 of a ridge cutter blade or ground cutting element 26 for the cutting away of ridges in the soil in advance of the front wheels B of the tractor A when the same is advanced. The purpose of the bolt 21' intermediate of the pivots 18 and 21 disposed crosswise with respect to the links 19 and 20 is to hold these links in a fixed spaced parallel relation to each other and to avoid any binding of said links at the points of the pivots 18 and 21 and also to give rigidity and strength in the working of the attachment.

At the forward end of the chassis of the tractor A are detachably bolted hangers 27 in which are journaled the ends 28 of a yoke or crank shaft 29, the yoke or crank portion being between the said hangers and upon which travel the rollers 30 of a shiftable yoke 31 in which is fitted a spring tensioned link 32 engaged at 33 with the connecting eye 34 on the carrier head 23. The yoke or crank of the shaft 29 has fitted thereon coiled springs 35 on opposite sides of the yoke 31 and operating to maintain the said yoke centered on this shaft yet allowing the said yoke to yield in reverse directions with the rollers 30 traveling upon the shaft 29.

On the chassis of the tractor A is a hand operated throw lever 36 equipped with a releasable latch 37 coacting with a keeper segment 38 so that the lever can be latched in adjusted position. The lever 36 has connection by a link 39 with an arm 40 fixed to one end 28 of the shaft 29 and by shifting the lever 36 the cutter 26 can be raised or lowered at will.

The blade 26 when in working position will cut ridges from the plowed ground surface in advance of the wheels B of the tractor and any irregular travel of the tractor will not effect the disposition of the blade 26 due to the interposition of the yoke 31 and spring tensioned link 32. This cutting away of the ridges in the ground surface relieves rough riding of the tractor A when the same is serving as a draft for agricultural machines or cultivating implements.

The side links 19 are of greater length than the links 20 and these links 19 carry a stop cross pin or bolt 41 which limits the change of position of the head 23 due to the disposition of the pin or bolt 41 within the frame end 14 of the bracket 13.

As has been stated, to eliminate rough travel or riding qualities to the tractor A the ridges within a ground surface over which such tractor is running will be cut away by the action of the blade 26 of the attachment and in this manner giving evenness of travel to such tractor in the use thereof for the draft of agricultural or farming implements or machines. The scraper 26 is associated with a conventional spring set break joint connection 42 between it and the standard 25 so that when the said scraper meets an obstruction it will override the same without causing damage thereto. The standard 25 is vertically adjustable in the clamps 24, there being set screws 24' fitting the latter for this purpose.

The spring 43 in the yoke 31 surrounds the link 32 slidably fitting the said yoke. This spring at one end is seated against the yoke and at the other end against a follower plate or an abutment 44 fixed in said link 32 so that a yieldable coupling between the carrier and throw lever is had. Thus on the turning of the wheels B from a straight path this coupling yields or lengthens correspondingly to the lateral turning or swinging of the said carrier with the wheels. The coupling constituted by the yoke 31, link 32 and spring 43 allows a yielding action between the carrier and the lever 36 when the tractor is turning, in that the rod or link 32 must slide relative to the yoke 31 in making a short turn in that the distance between the carrier and the said yoke is increased.

On the swing of the lever 36 for the raising of the carrier, this coupling constituted by the yoke 31, link 32 and spring 43 will yield in event that said carrier is stalled in its upward swing by the pin or bolt 41 engaging the diagonal brace 45 in the frame 14 of the bracket 13 so that said lever 36 can be latched to hold the scraper 26 elevated notwithstanding the fact that said lever has been shifted too far on the keeper 38.

The tendency of the rear portion of the tractor to raise or lower does not appreciably affect the cutting depth of the scraper 26 due to the fact that the rear wheels (not shown) of said tractor are at a considerable distance removed from the front wheels B thereof.

What is claimed is:

1. An attachment for a tractor having a front steering mechanism comprising a bracket fixed to said mechanism and having an upstanding frame, a carrier head vertically disposed forwardly of said frame and having vertical swinging connection therewith, a ground scraper supported by said head, a hanger fixedly held elevated above said frame, a cranked shaft journaled in said hanger, spring tensioned connections between the head and the crank of said shaft, and means on the tractor for turning said shaft.

2. An attachment for a tractor having a front steering mechanism comprising a bracket fixed to said mechanism and having an upstanding frame, a carrier head vertically disposed forwardly of said frame and having vertical swinging connection therewith, a ground scraper supported by said head, a hanger fixedly held elevated above said frame, a cranked shaft journaled in said hanger, spring tensioned connections between the head and the crank of said shaft, means on the tractor for turning said shaft, and means on the head for adjustably connecting the ground scraper with said head.

3. An attachment for a tractor having a front steering mechanism comprising a bracket fixed to said mechanism and having an upstanding frame, a carrier head vertically disposed forwardly of said frame and having vertical swinging connection therewith, a ground scraper supported by said head, a hanger fixedly held elevated above said frame, a cranked shaft journaled in said hanger, spring tensioned connections between the head and the crank of said shaft, means on the tractor for turning said shaft, means on the head for adjustably connecting the ground scraper with said head, and means for latching the first-named means in adjusted position.

4. An attachment for a tractor having a front steering mechanism comprising a bracket fixed to said mechanism and having an upstanding frame, a carrier head vertically disposed forwardly of said frame and having vertical swinging connection therewith, a ground scraper supported by said head, a hanger fixedly held elevated above said frame, a cranked shaft journaled in said hanger, spring tensioned connections between the head and the crank of said shaft, means on the tractor for turning said shaft, means on the head for adjustably connecting the ground scraper with said head, means for latching the first-named means in adjusted position, and means on the shaft and active upon the connections to yieldably maintain the said connections longitudinally centered with relation to said tractor.

ALBERT N. WENDEL.